Nov. 21, 1933.    C. E. DUNLAP    1,935,700
STRIP BEVELING MACHINE
Filed March 19, 1931    3 Sheets-Sheet 1

Nov. 21, 1933.　　　C. E. DUNLAP　　　1,935,700
STRIP BEVELING MACHINE
Filed March 19, 1931　　　3 Sheets-Sheet 2
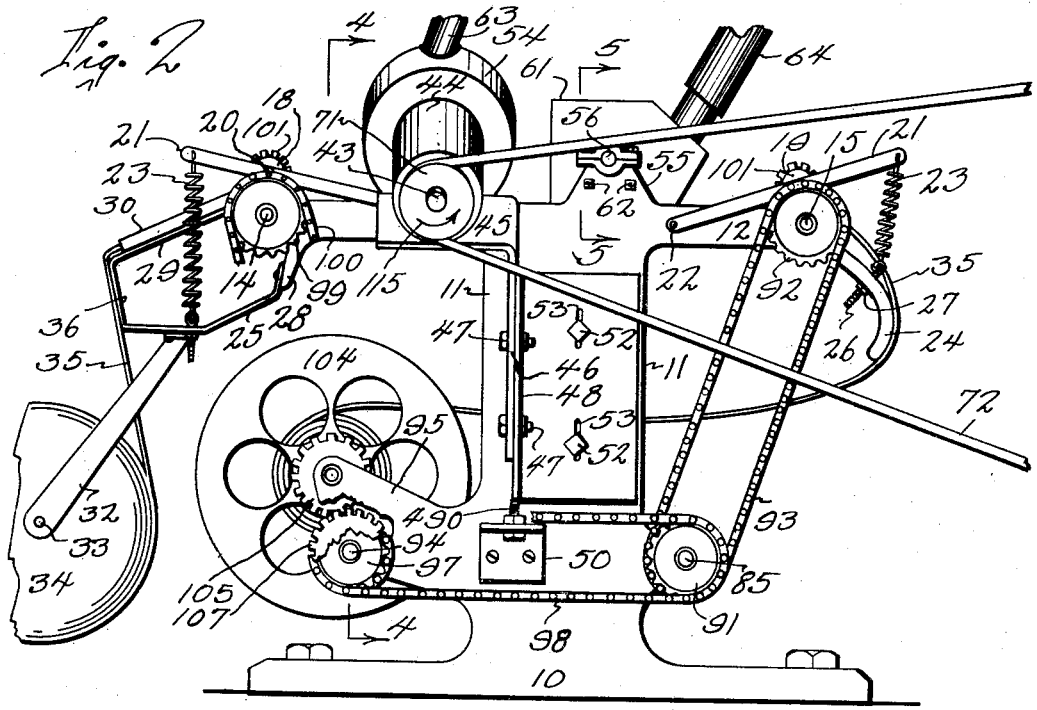
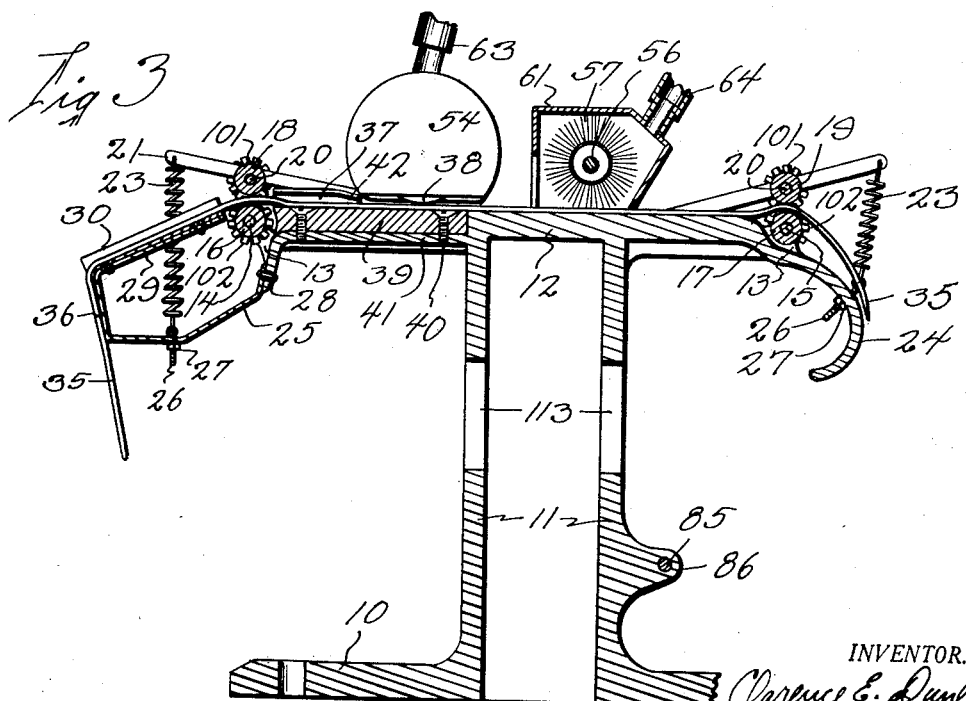
INVENTOR.
Clarence E. Dunlap
BY
Lynn H. Latta
ATTORNEY

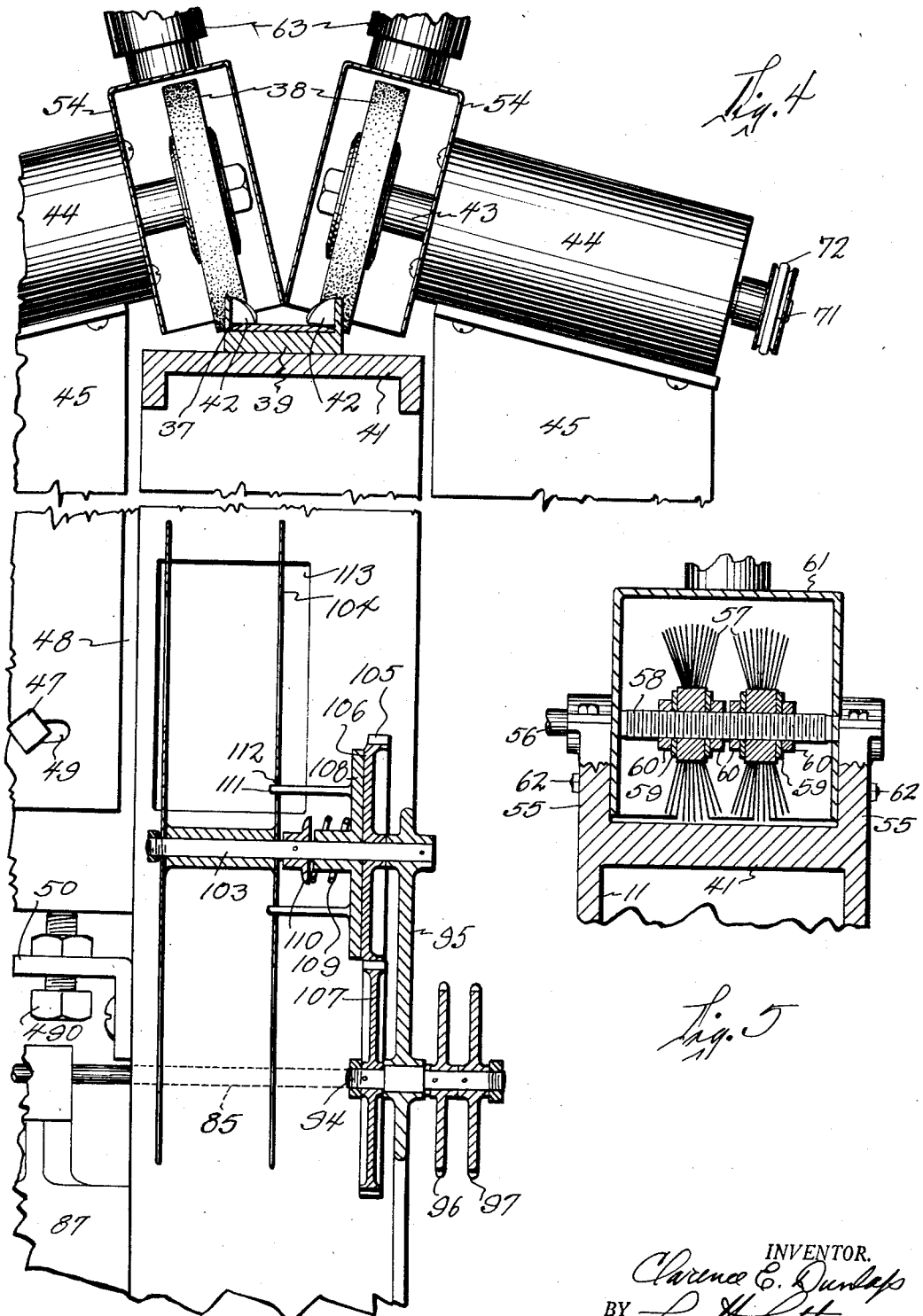

Patented Nov. 21, 1933

1,935,700

UNITED STATES PATENT OFFICE 1,935,700

STRIP BEVELING MACHINE

Clarence E. Dunlap, Sioux City, Iowa

Application March 19, 1931. Serial No. 523,789

3 Claims. (Cl. 51—78)

My invention relates to automatic machinery and particularly to a machine adapted to bevel the edges of a strip of tire patch rubber fed longitudinally through the machine.

The primary object of this invention is to provide an organization of working tools and feeding mechanism capable of handling a strip of resilient, soft rubber of the type employed for tire patches. It will be understood that there are problems which arise in connection with the handling of material of this kind which are peculiar thereto and which do not arise in connection with handling strips of other material. For instance, the rubber is quite elastic and stretchable and is provided on one of its faces with an attached strip of relatively non-stretchable linen for the purpose of protecting the face of the uncured layer of rubber.

The present invention proposes to produce a beveled edge on a strip of rubber by what may be termed the "buffing method", i. e., subjecting the corners of the strip of rubber to the action of rapidly rotating abrasive wheels.

One of the problems which has been discovered to exist in connection with a machine of this type is that of feeding the strip of rubber through the machine without breaking the strip of linen protective material. It is possible to stretch the rubber until the linen breaks without breaking the rubber, and it would thus be possible for the machine to continue operating and feeding the rubber strip past the working tools without the operator noticing that the linen strip was being occasionally broken.

The present invention has for its object to overcome this problem, and it is accomplished generally by the provision of two sets of feed rollers, one ahead of and one behind the working tool, one set serving to feed the strip from the strip roll to the working bed of the machine and the other being adapted to pull the strip beneath the working tool, whereby the pull of the latter pair of rollers need only be sufficient to overcome the resistance of the working tools.

Other elements entering into the solution of this problem are the provision of adjustable tensions for the rollers, the mounting of the rollers substantially tangentially of the working bed, the provision of adjustment for the working tools, and provision for giving rotation for both sets of rollers at exactly the same speed.

The last element is an important one, and is preferably accomplished by driving the rollers from a single source of power with a transmission which serves to produce the effect of intergearing between the rollers.

Another element of the invention in this respect is the provision for rotating the buffing wheels so that their peripheries at the point of working contact are traveling with the rubber rather than against it.

Another object of my invention is to provide a compact arrangement of working bed, working tools, strip moving rollers, strip roll support, and a collecting reel.

Another difficult problem encountered in working with soft rubber strips is that of producing a clean cut by the working tool. It has been discovered that in beveling edges of a strip of patch rubber, the buffing wheels will leave a thin film of rubber particles tenaciously clinging to the beveled edges of the strip. Why this should be true in beveling strip rubber as compared with beveling small, circular patches in which the problem does not present itself, is not entirely clear, but the difficulty has been discovered by experiment with strip beveling.

To be commercially acceptable, the beveled strips must be provided with clean, smooth edges, and it is my object to provide an arrangement for attaining this end. In general, this phase of the invention is embodied in the provision of an arrangement wherein the strip is successively subjected to the action of buffing wheels and thence to the action of brushing wheels to remove the clinging film of rubber.

Another problem encountered in beveling a strip of soft rubber is that of causing the strip to feed smoothly in a straight line through the machine. The pressure of a buffing wheel has a tendency to cause a strip of rubber to creep. It is therefore my object to provide an arrangement wherein a pair of buffing wheels are mounted with their axes in the same plane so that the two wheels are opposed to each other, whereby the action of one wheel is balanced by that of the other and the strip will be caused to travel in a straight line through the machine. The balancing of the wheels is effected by means of adjustable mountings for the wheels.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

Figure 1 is a plan view of the machine,

Figure 2 is a side elevation of the same,

Figure 3 is a longitudinal, sectional view through the machine.

Figure 4 is a transverse, sectional view taken on the line 4—4 of Figure 2, and

Figure 5 is a detail, sectional view taken on the line 5—5 of Figure 2.

The machine is provided with a base 10 from which projects upwardly a pedestal 11 terminating in a working bed 12. At the respective ends of the working bed 12 are pairs of spaced opposed ears 13 in which are journalled the shafts 14 and 15 of the lower strip moving rollers 16 and 17 respectively.

Superimposed above the roller 16 is a roller 18 forming therewith a pair of feed rollers and superimposed above the roller 17 is a roller 19 forming therewith a pair of pulling rollers.

The rollers 18 and 19 are provided with shafts 20 journalled in bearing brackets 21 in the form of elongated arms pivoted at 22 to the sides of the working bed 12.

To the outer ends of the brackets 21 are secured springs 23 which are adjustably attached to members 24 and 25 by means of threaded screw eyes 26. Nuts 27 threaded onto the screw eyes 26 may be tightened or loosened to tighten or loosen the tension on the springs 23.

The member 24 is preferably formed as an integral extension of the bed 12 and the member 25 is a feed guide bracket secured to a depending ear 28 formed on the bed 12.

The member 25 is bent back over itself as at 29 and to the portion 29 is secured a channel shaped feed guide 30. The guide 30 is removably secured as by means of screws 31 (see Figure 1), so that guides of various widths may be attached to the bracket.

A pair of roll supporting arms 32 are secured to the bracket 25 and depend forwardly and downwardly as shown in Figure 2, and the roll shaft 33 is received through appropriate openings in the lower ends of the arms to support a roll 34 of patch rubber.

The strip 35 of rubber from the roll 34 passes upwardly against the forward face portion 36 of the bracket 28 and thence through the feed guide 30 to the feed rollers 16, 18, from thence it passes through a second guide 37 to the buffing wheels 38.

The guide 37 is formed with a base 39 which is attached by means of screw 40 to a depressed portion 41 of the bed 13, the depressed space in the bed being sufficient to bring the upper surface of the guide base 39 flush with the upper surface of the remainder of the bed 12. Thus the guide base 39 becomes a part of the feed bed providing a straight, flat surface over which the rubber may travel.

The flanges of the guide 37 are perpendicular adjacent the rollers 16, 18, but adjacent the buffing wheels 38 they are bent toward each other and downwardly as at 42 in Figure 4.

Various guides 37 may be interchangeably used for various widths of strip rubber.

The buffing wheels 38 are mounted on wheel shafts 43 which are journalled in bearings 44 in turn mounted on bearing brackets 45. The brackets 45 are provided with depending portions 46 which are secured by means of bolts 47 to supporting bracket 48.

The bolts 47 extend through horizontal slots 49 either in the bracket 46 or in the bracket 48, and thus the bracket 46 may be adjusted laterally of the machine.

To provide for vertical adjustment, which is independent of the lateral adjustment, I employ set screws 49 threadedly engaged with ears 50 projecting from the pedestal 11 and engaging against the lower edge of the bracket 48. The bracket 48 is mounted for vertical sliding movement by means of cap screws 52 received through the slots 53 in the bracket and threaded into the pedestal 11.

Thus it will be seen that the lateral adjustment of the buffing wheels may be accomplished without disturbing the vertical adjustment thereof and vice-versa.

Secured to the inner faces of the bearings 44 are dust collar housings 54 which inclose all except the lower extremities of the wheels.

In a pair of bearing brackets 55 projecting upwardly from the sides of the bed 12 just behind the buffing wheels, is mounted a shaft 56 which carries the brushing wheels 57. The wheels 57 are preferably steel wire brushes, and are adjustably mounted on the threaded portion 58 of the shaft 56 by means of face plates 59 and retaining nuts 60.

A brushing wheel housing 61 is secured to the inner faces of the bracket 55 as by means of bolts 62.

Dust collar tubes 63 and 64 respectively communicate with the buffing wheel and brushing wheel housings 54 and 61 respectively.

A power shaft 65, mounted in a suitable bearing 66, drives the various working parts of the machine. The shaft is mounted parallel to the shafts 14, 15, and 56 respectively, all of which are parallel to each other, and parallel to the vertical plane of the shafts 43. Pulleys 67 and 68 on the power shaft 65 and brushing wheel shaft 56 respectively are connected by a belt 69 which serves to drive the brushing wheel.

Much larger pulleys 70 on the power shaft 65 drive the smaller pulleys 71 on the wheel shafts 43 through the medium of belts 72.

A clutch shaft 73, mounted in bearings 74 and 75 respectively on a bracket 76 projecting laterally from the pedestal 11 on one side of the machine is provided with a pulley 77 aligned with the pulley 78 on the power shaft 65. A belt 79 connects the pulleys 78 and 77 to transmit rotation to the shaft 73 at a reduced rate of speed.

A pinion 79 is loosely mounted on the shaft 73, and provided with a clutch element 80 to co-act with a slidable clutch element 81, splined as at 82 to the shaft 73. The element 81 includes a sleeve with which a clutch fork 83 on a control lever 84 cooperates.

A transmitting shaft 85, journalled in bearings 86 and 87 on the pedestal 11 carries a gear 88 which meshes with the pinion 79. The shaft extends from side to side of the machine and on the side opposite the gear 88 is provided with sprockets 90 and 91. A sprocket 92 on the roller shaft 15 is aligned with the sprocket 90 and a chain 93 connects them.

A counter shaft 94, mounted in a bearing bracket 95 on the pedestal 11 is provided with a pair of sprockets 96 and 97, one of which is aligned with the sprocket 91 and driven therefrom by a chain 98 and the other of which is aligned with a sprocket 99 on the roller shaft 14 and drives the same by means of a chain 100.

In order to transmit rotation at the same speed to both rollers 16 and 17, the sprockets 99, 92, 91 and 97 may be all made the same diameter, or the sprocket 97 and 90 may be the same in diameter, the sprockets 96 and 90 may be the same diameter, and the sprockets 99 and 92 may be the same diameter.

Meshing gears 101 and 102 are mounted on the shafts 20, 15, and 20, 14, respectively, thus gearing the rollers 19, 17 and 18, 16 together in pairs.

Mounted in the bracket 95 and secured therein is a reel shaft 103 on which is rotatably mounted a reel 104. A nut 105 threaded onto the end of the shaft 103 allows removal of the reel 104.

A gear 105, provided with a flat clutch face 106, is loosely mounted in the shaft 102 and meshes with a gear 107 secured to the shaft 94.

A clutch element 108 has a flat face in frictional contact with the clutch face 106 and is urged thereagainst by a spring 109 urged against the clutch element 108 by a collar 110 secured to the shaft 103. The collar 110 may also serve as a shoulder against which the reel 104 is secured.

Clutch fingers 111 on the clutch element 108 extend through openings 112 in the reel 104 whereby the reel is driven from the clutch element 108.

It may now be noted that the gear 105 is driven at a constant rate of speed from the gear 107 which in turn is driven by the shaft 94, and this rate of speed is made sufficient so that when the reel commences to wind up the strip of rubber, it will collect the strip as fast as it is discharged from the rear end of the machine.

As the roll on the reel becomes larger however, the reel will be required to rotate more slowly in order to take up the strip of rubber. The friction clutch allows the reel to slip behind the rotation of the power transmitting gearing, just sufficient rotative pull being exerted against the reel to take up the slack in the length of rubber pendant between the rear end of the machine and the reel. To accommodate this length of rubber, I provide openings 113 in the pedestal 11.

In the operation of the machine, the rubber is fed from the reel 34 through the guide devices as already described and the depressed portions 42 of the secondary guides' flanges hold the rubber strip snugly against the face of the working bed as it enters the space below the buffing wheels.

The buffing wheels are inclined at the proper angles to give the desired bevels to the edges of the strip, and are opposed to each other with their axes in the same plane so that the strip will feed smoothly through the machine without creeping.

The same is true of the wire brushing wheels 57, which are mounted on the same shaft so as to be opposed to each other.

The feed rollers 18, 16 carry the strip into the machine so that there will be no tension in that portion of the strip between the feed rollers and the buffing wheels, save what little tension may be produced by the abrasive action of the wheels.

The buffing wheels rotate in the direction indicated by the arrow 115, whereby their peripheries at the point of working contact are traveling with the strip, thus aiding in the feeding of the strip through the machine.

I have found that it is unsatisfactory to rotate the wheels in a reverse direction, there being a tendency for the rubber to pile up beneath the wheels and for the linen to be broken. This latter is probably due to the fact that the pull of the wheels against the rubber is thus opposed to the pull of the pulling rollers which carry the strip out of the machine.

The film of rubber left on the edges of the strip by the buffing wheels is removed as the strip passes beneath the brushing wheels 57, and the strip is carried out of the machine by the pulling rollers 19, 17. It thence passes around the lip 24 through the openings 113 and to the reel 104. The rollers 19, 17 pull the rubber through the machine from the feed rollers 18, 16, keeping the strip taut and flat against the working bed so that there is no likelihood of the strip becoming jammed beneath the wheels.

The arrangement of the housing 57 behind the buffing wheels is such that any rubber dust thrown from the periphery of the rapidly rotating abrasive wheels and escaping from the housing 54 below the lower edge of the same will enter the housing 57 which is open at the front for this purpose. (See Figure 3.)

Some changes may be made in the construction and arrangement of the parts of my invention without departing from the real spirit and purpose of my invention, and it is my intention to cover by my claims any modified forms of structure or use of mechanical equivalents which may be reasonably included within their scope.

I claim as my invention:

1. In a strip working machine, a working bed, and means for forming bevels lengthwise of a strip of soft rubber which is fed over the bed, comprising a pair of opposed buffing wheels positioned to simultaneously engage both edges of the strip at acute angles to the face thereof while the strip lies flatly upon the bed, and means for further cleaning of the beveled edges thus formed comprising a pair of brushing wheels positioned to engage the strip and the beveled edges after it has left the buffing wheel, a pair of strip moving rollers to feed the strip of rubber over the working bed, a collecting reel, a reel shaft on which the reel is mounted, a drive connection between the reel shaft and one of said rollers, to give the reel shaft rotation at a rate constant relative to that of the roller.

2. In a strip working machine, a working bed, and means for forming bevels lengthwise of a strip of soft rubber which is fed over the bed, comprising a pair of opposed buffing wheels positioned to simultaneously engage both edges of the strip at acute angles to the face thereof while the strip lies flatly upon the bed, and means for further cleaning of the beveled edges thus formed comprising a pair of brushing wheels positioned to engage the strip and the beveled edges after it has left the buffing wheel, a pair of strip moving rollers to feed the strip of rubber over the working bed, a collecting reel, a reel shaft on which the reel is mounted, a drive connection between the reel shaft and one of said rollers, to give the reel shaft rotation at a rate constant relative to that of the roller, and a slip clutch between the reel and its shaft tending to rotate the reel at the same rate as the shaft but allowing the reel movement to retard as the strip is wound upon the reel.

3. In a machine for beveling the edges of strip rubber, buffing wheels positioned so that their abrasive faces are parallel to the beveled edges of the rubber, a pair of feed rollers, and a pair of pulling rollers, positioned to feed and pull a strip of rubber to and away from the buffing wheels, and a pair of brushing wheels arranged to further clean the rubber strip after it has left the buffing wheels, a collecting reel, and driving means between the collecting reel and the rollers for maintaining a uniform rotation of the reel relative to the rolls.

CLARENCE E. DUNLAP.